Dec. 30, 1969 L. S. RAISCH 3,486,357
ANNULAR CORRUGATING APPARATUS FOR TUBING
Filed June 21, 1968 4 Sheets-Sheet 1
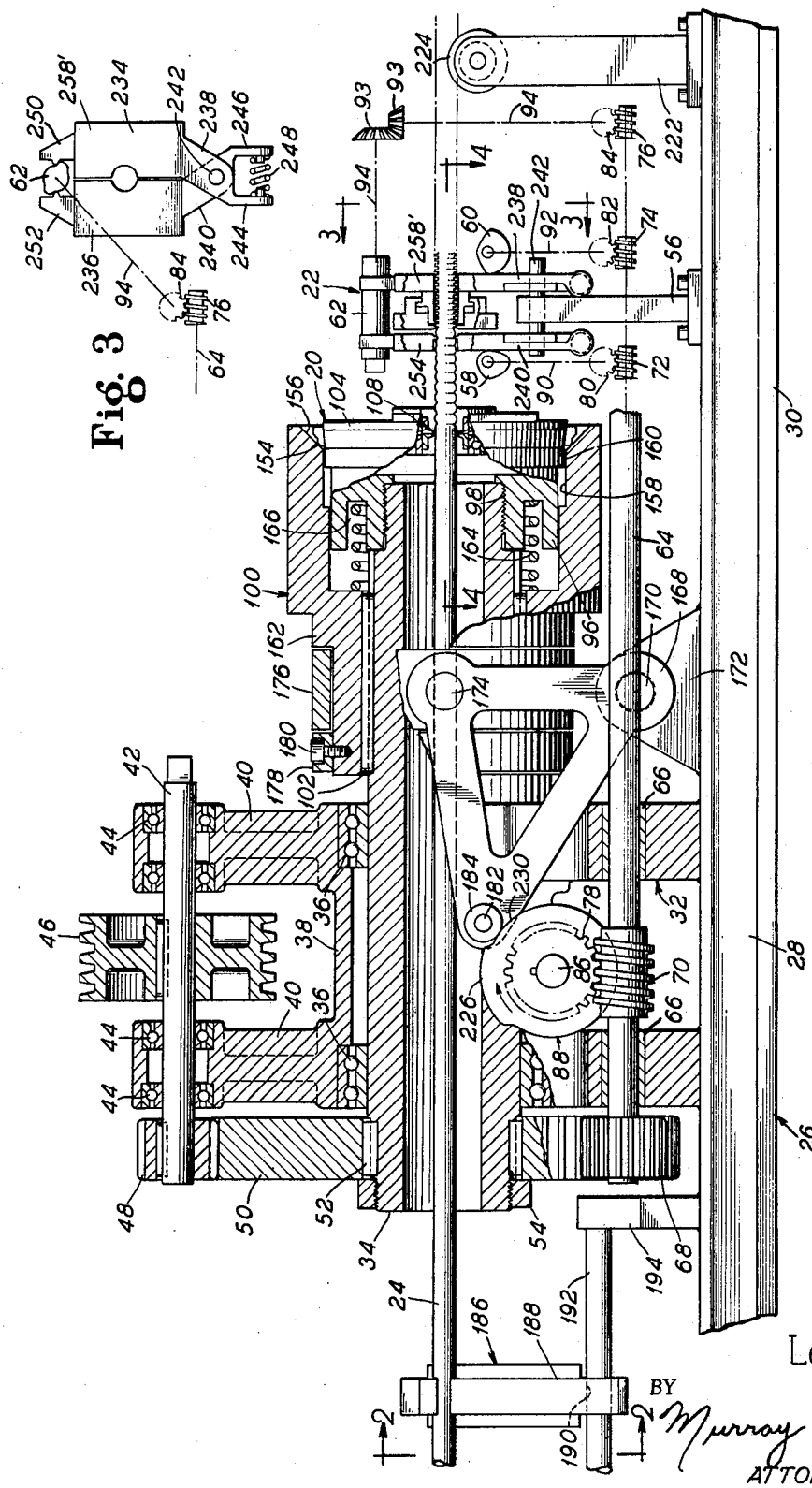
INVENTOR.
Lee S. Raisch
BY
Murray A. Gleeson
ATTORNEY Dec. 30, 1969  L. S. RAISCH  3,486,357
ANNULAR CORRUGATING APPARATUS FOR TUBING
Filed June 21, 1968  4 Sheets-Sheet 2

INVENTOR.
Lee S. Raisch
BY
Murray A. Gleeson
ATTORNEY

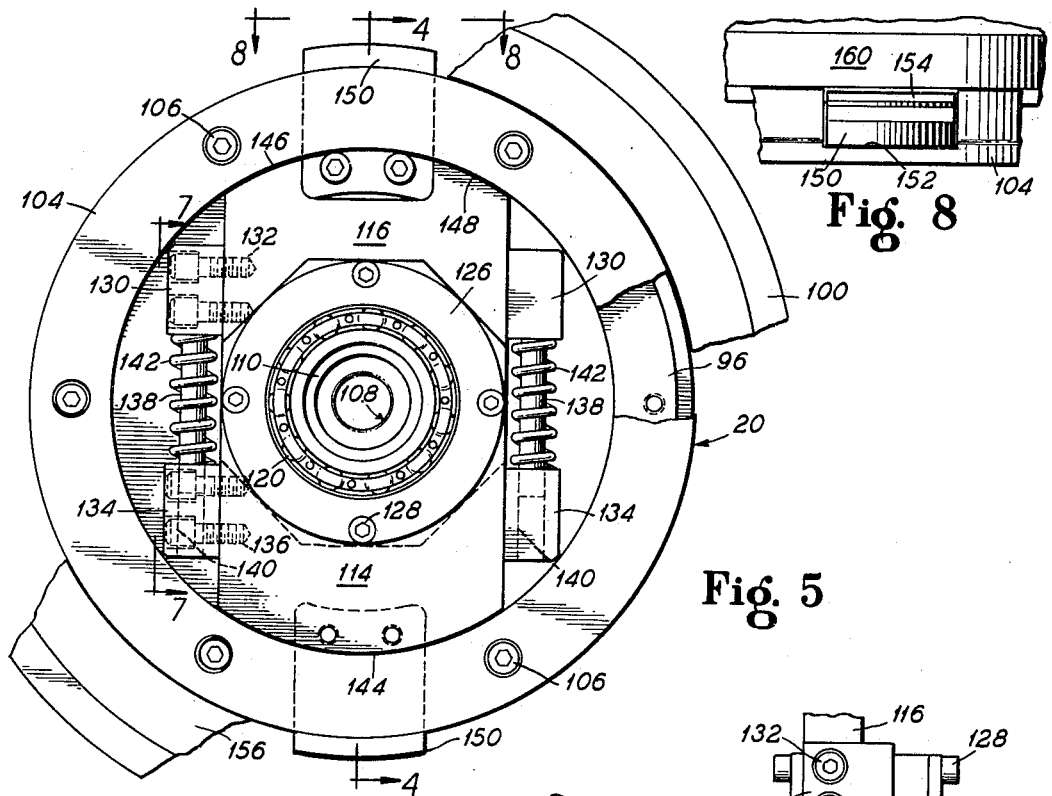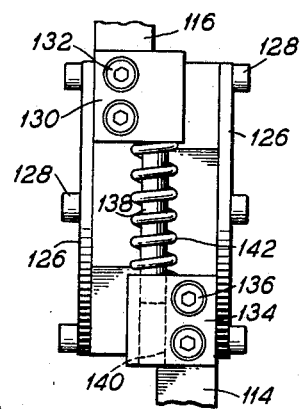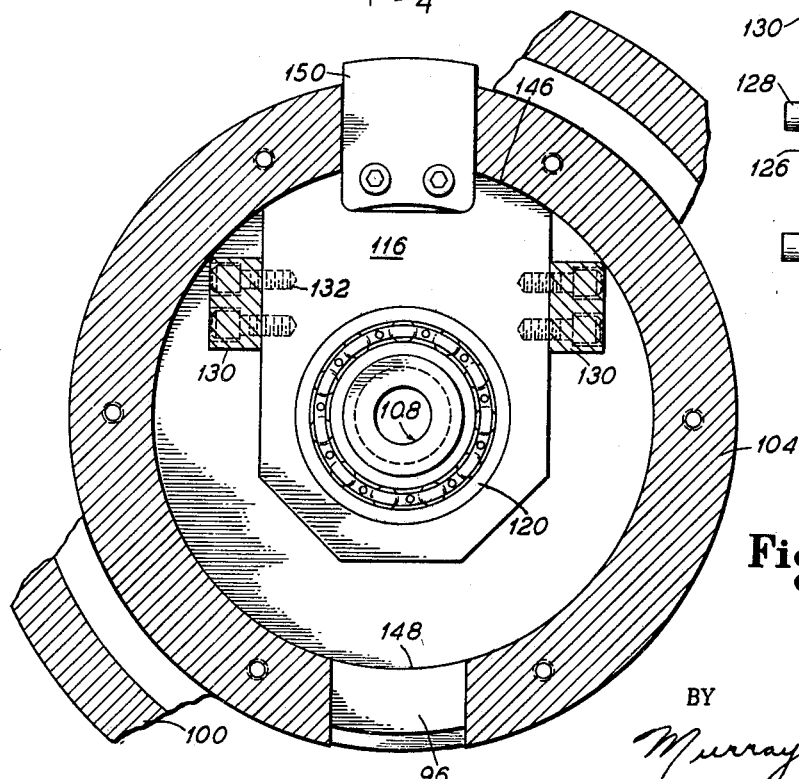

Dec. 30, 1969   L. S. RAISCH   3,486,357
ANNULAR CORRUGATING APPARATUS FOR TUBING
Filed June 21, 1968   4 Sheets-Sheet 4

INVENTOR.
Lee S. Raisch
BY
Murray A. Gleeson
ATTORNEY

United States Patent Office 3,486,357
Patented Dec. 30, 1969

3,486,357
ANNULAR CORRUGATING APPARATUS
FOR TUBING
Lee S. Raisch, Chicago, Ill., assignor to Universal
Metal Hose Company, Chicago, Ill., a corporation of Delaware
Filed June 21, 1968, Ser. No. 738,910
Int. Cl. B21d 15/06; B21b 19/16, 31/20
U.S. Cl. 72—77                                        9 Claims

ABSTRACT OF THE DISCLOSURE

Apparatus for making annular corrugated tubing. First head, which generates a series of grooves, carries a pair of annular half die rings through which the tubing advances. Each half die ring has a continuous circular inner periphery closely adjacent the other and is independently freely rotatable and diametrically shiftable between concentric and eccentric positions. Tubing is advanced while both half die rings are concentric. Groove is generated by rotating head and shifting both half die rings eccentric simultaneously, causing their inner peripheries to bear indentably on diametrically opposite side portions of the tubing, each indenting a corresponding side of the groove.

Background of the invention

The field of invention is apparatus for making annular corrugated tubing as distinguished from helical corrugated tubing. Customarily, smooth wall tubing to be annularly corrugated is periodically advanced through a first head or operation which generates a series of axially spaced annular grooves with outwardly convex corrugations therebetween. In a second head or operation, the corrugations are axially compressed to improve the strength and flexibility of the finished product. In conventional apparatus, difficulty is often experienced in the first head or operation, especially when corrugating very thin wall tubing, such as stainless steel, which may gall or seize. During the initial grooving, there is a tendency for the tubing to collapse, go oval, bend axially, or flail on leaving the first head, with the indenting dies or rolling die rings conventionally used.

Summary of the invention

A principal object of the present invention is to provide apparatus for making thin-wall annular corrugated tubing in which the initial groove-generating step is greatly improved.

An important principle of the present invention involves simultaneously applying diametrically balanced indenting forces entirely within the particular groove being generated.

A specific object of the invention is to provide, in apparatus for forming annular corrugations in tubing, a first forming head having annular die means surrounding the tubing and comprising a pair of independent, freely rotatable, annular half die rings which are simultaneously shifted eccentrically to indentably bear on diametrically opposite side portions of the tubing for generating a single annular groove with each of the half die rings independently forming a corresponding half of the groove.

For simplicity, the annular die means which comprises an important part of the present invention, may be visualized as split, along a common plane perpendicular to the axis of rotation, into two identical, annular half rings abutting one another and being rotatable and slidable relative to one another in that common plane.

Other objects and advantages will be apparent from the following description taken in connection with the drawings in which:

FIGURE 1 is partly a side elevation and partly a longitudinal sectional view of a tubing corrugating machine embodying the present invention, with certain portions being shown schematically;

FIG. 3 is a right end view of FIG. 1 taken along line 3—3;

Figure 4:
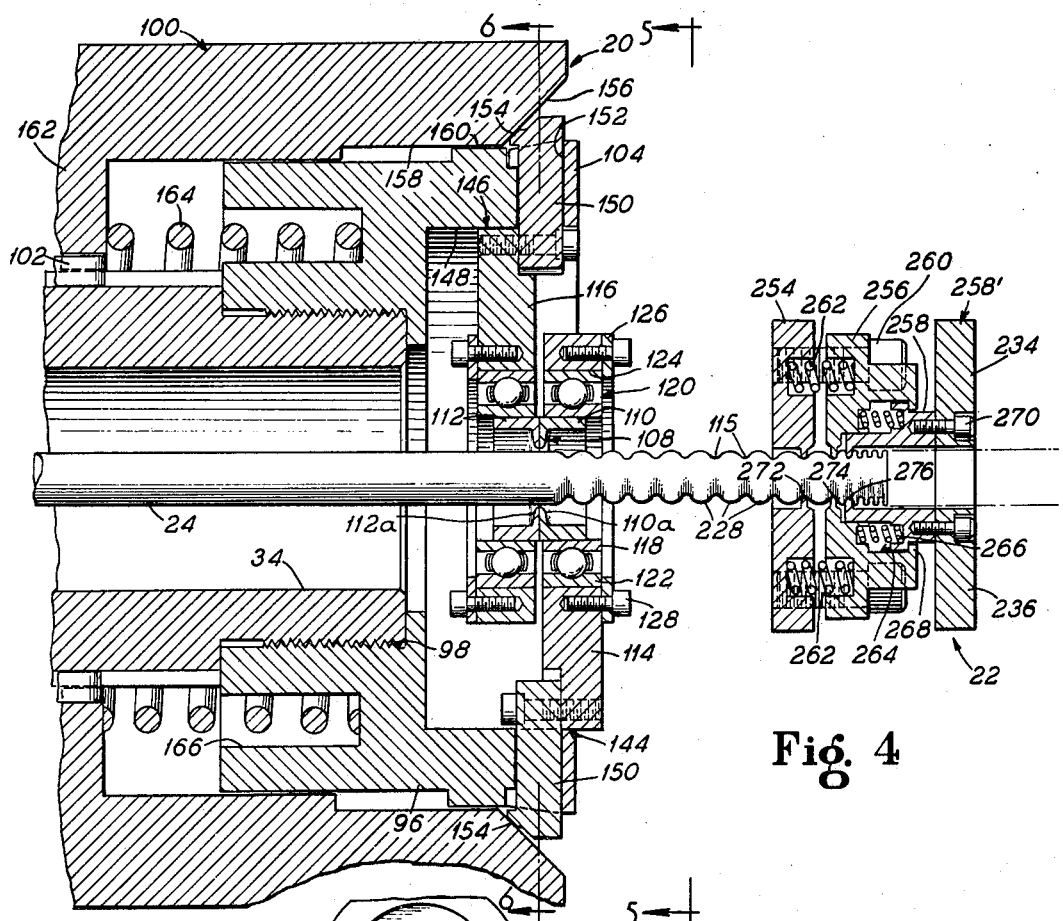
FIG. 4 is an enlarged fragmentary cross sectional view of FIG. 1, and of FIG. 5, taken along the line 4—4 showing the corrugating compressing mechanism just prior to a compressing operation.
Figure 9:
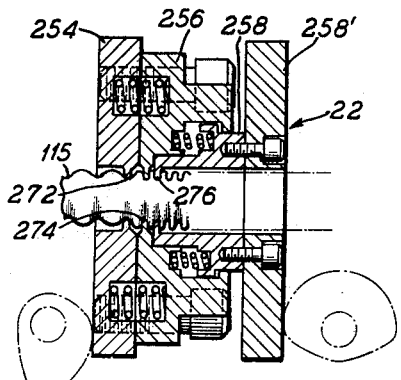
Figure 10:
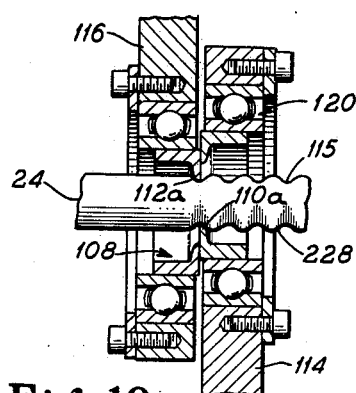

FIGS. 5 and 6 are cross sectional views of FIG. 4 taken along lines 5—5 and 6—6 respectively;

FIGS. 7 and 8 are fragmentary views of FIG. 5 taken along lines 7—7 and 8—8 respectively;

FIG. 9 is a view similar to the right hand portion of FIG. 4 just after a compressing operation;

FIG. 10 is a fragmentary view of the left hand portion of FIG. 4 but showing the annular half die rings in an eccentric operative condition; and FIGS. 11 through 15 are schematic representations of five different stages of the corrugation compressing operation.

Like parts are identified by like reference characters throughout the figures of the drawings.

Referring now in detail to the drawings, a preferred embodiment of the invention is shown, using schematic representations of certain elements and functions where they will simplify and facilitate the description. First and second axially aligned forming heads 20 and 22 through which tubing 24 passes is mounted in any suitable manner on an elongated bed or main frame 26.

The first head is an indenting head for making a series of grooves to define shallow, initial corrugations. The second head is a compressing head for compressing and shaping the corrugations in a 2-step operation.

The first head 20 is an important part of the present invention and is shown and described in detail. The second head 22 is shown and described only schematically as representative of apparatus which may be employed to compress and shape the corrugations made by the first head.

Figure 2:
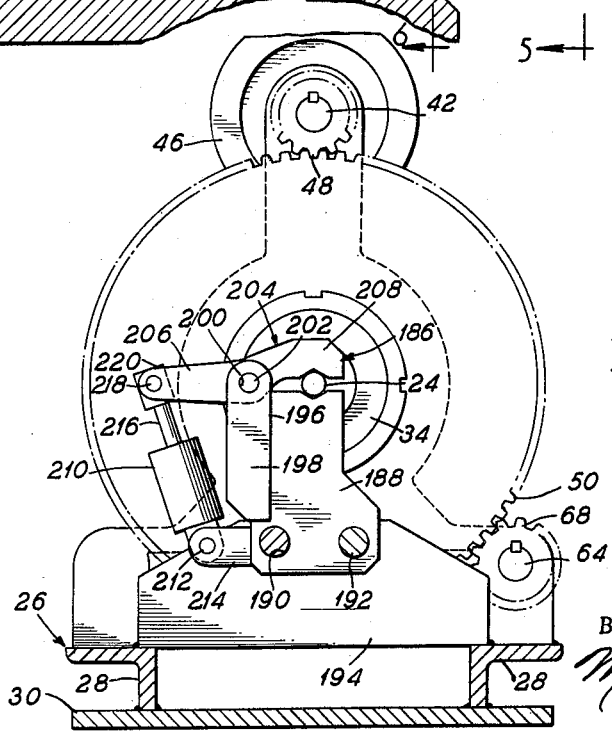
FIG. 2 is a left end view of FIG. 1 taken along line 2—2.

As best shown in FIG. 2, the main frame 26 consists of a pair of angle bars 28 welded onto a base plate 30.

A journal support or sub-frame 32 is welded atop the angle bars 28. A hollow main shaft 34 is journaled for rotation in main bearings 36 in a cylindrical bearing mount 38 forming part of the sub-frame 32. The sub-frame is provided with a pair of upstanding supporting arms 40. A drive shaft 42 is mounted in suitable bearings 44 in these arms 40. Shaft 42 is adapted to receive power from a prime mover (not shown) by means of a multi-belt pulley or wheel 46 or by other suitable means.

The main shaft 34 is driven by shaft 42. The latter has a pinion 48 meshed with gear 50 on main shaft 34, gear 50 being splined or keyed at 52 and held by a threaded end retainer ring 54.

The second head 22 does not revolve nor is its mounting frame 56 subject to rotation or reciprocation. However, the head itself is compressed, reciprocated, opened and closed in predetermined sequence by cams 58, 60 and 62 which are schematically shown.

A cam drive shaft 64 is rotatably journaled as by bearings 66 and has a driving pinion 68 meshed with the main gear 50.

Cam shaft 64 has a series of worms 70, 72, 74 and 76 meshed respectively with worm wheels 78, 80, 82 and 84. Worm wheel 78 is connected through shaft 86 to rotate cam 88. Similarly, but schematically shown, worm wheel 80 rotates cam 58 on shaft 90; worm wheel 82 rotates cam 60 on shaft 92; and worm wheel 84 rotates cam 62 on shaft 94. To simplify the schematic presentation, shaft 94 is shown in two sections connected by beveled gearing 93, 93. No attempt is made in the schematic views to show sizes or ratios of the worms and worm wheels as this will be obvious to one skilled in the art and is subject to considerable variation depending on the desired sequence and movements of the elements comprising the indenting and compressing heads 20 and 22.

The first or indenting head 20 comprises an annular die housing 96 threadedly engaged at 98 which the main shaft 34 for rotation therewith. An annular actuating sleeve 100 is likewise rotatable with the main shaft 34 and, further, is limitedly reciprocable along it by means of a splined or feathered connection 102.

As best shown in FIGS. 1 and 4–6, the annular or cylindrical body 96 of the indenting head is provided, on the exit end, with a retaining ring 104 fastened by screws 106.

The indenting die means 108 carried by the first head 20 is a significantly important part of the present invention. It comprises a pair of annular half die rings 110 and 112 rotatably mounted respectively in supports 114 and 116 which are transversely shiftable within the head 20.

The annular half die rings 110 and 112, and their supports, in the present case are identical. Their cross sectional shapes are shown in FIG. 4 where it will be seen that the two annular half die rings and their supports are symmetrical on both sides of a plane 6—6. In the position of FIG. 4, the annular half die rings 110 and 112 are axially aligned, therefore in their open position to enable tubing 24 to be advanced through them. For this purpose the diameter of the circular opening through the indenting die means 108, when half die rings are aligned, is somewhat greater than the outside diameter of the tubing.

The combined shape of indenting die means 108, taking into consideration both of the annular half die rings 110, 112 generates a single annular groove 115 in the tubing. Each of the respective inner peripheries 110a and 112a of the annular half die rings indents a corresponding half of the groove 115. Hence, elements 110, 112 are herein referred to as "annular half die rings" being continuous, circular, but split into two identical elements slidably and rotatably abutting relatives to one another along a common plane 6—6 (FIG. 4). The supports enabling this cooperation will now be described.

Referring now to FIGS. 4 and 5, annular half die rings 110, 112 are rotatably journaled respectively in plates or supports 114, 116.

In each case the annular half die ring 110 or 112 is press fitted into the inner race 118 of a ball bearing 120 and the outer race 122 is held in a bore 124 in the corresponding support plate. A retainer ring 126 (FIG. 5), fastened by screws 128, holds the outer race in place in each instance.

Thus, each annular half die ring 110, 112 can rotate about its own axis, within its own bearing, independent of the other. As shown in FIG. 4, the annular half die rings are abutted back-to-back, and slidable and rotatable relative to each other in the common plane 6—6. This enables them to function independently but coact in simultaneously applying diametrically balanced indenting forces entirely within a particular groove being generated.

Each annular half die ring support plate 114, 116 is transversely slidable within the cylindrical housing 96 to shift its corresponding annular half die ring between eccentric and concentric positions. To this end, and as shown in FIGS. 5 and 7, a block 130 is fixed by screws 132 on each side of the support plate 116. Similarly, a block 134 is held by screws 136 on each side of the support plate 114. A guide rod 138 is fastened in each block 130 and the other end of each rod is slidably fitted within a bore 140 in the corresponding block 134. A spring 142 is compressed between each set of blocks 130, 134 and biases the supports 114, 116 toward the FIGS. 4 and 5 position where the annular half die rings are concentric. In this position, the other ends 144, 146 of the supports function as stops, engaging the bore 148 of the cylindrical housing 96 or the retaining ring 104, whichever happens to be the most convenient. This is the open or concentric condition in which the tubing 24 is advanced between indenting operations.

Each support 114 and 116 is provided with a radial extension 150 slidably mounted in an opening 152 in the head retainer ring 104. Each extension 150 has a beveled outer surface 154 which is engageable by the beveled surface 156 of the actuating sleeve 100 to shift the annular half die rings 110, 112 to their eccentric, indenting positions as described in connection with FIG. 10.

The actuating sleeve 100 has a bore 158 slidable on the outer cylindrical surface 160 of the head housing 96 and a corresponding outer surface of the retainer ring 104. The end portion 162 remote from the ring 104 is splined to the main shaft at 102. A coil spring 164 is compressibly interposed between the actuating sleeve 100 and the head cylindrical housing 96 in the annular space 166. It biases the sleeve 100 away from the head 20 toward the non-actuated position shown in FIG. 1.

Means for moving the sleeve 100 to actuate the head 20 will now be described. A bell crank 168 is pivoted on pin 170 carried by bracket 172 fastened to the bed frame 26. It carries a pin 174 pivoted to operating ring 176 which is loosely fitted over the sleeve portion 162 and is retained by a keeper ring 178 held by bolts 180 to the sleeve. The operating ring 176 is non-rotatable and suitable clearance is provided in enabling the actuating sleeve 100 to rotate within it.

The bell crank 168 has a third pin 182 supporting a follower roller 184 engaged with cam 88 on shaft 86 which is driven by worm wheel 78 previously described.

Where desired, to balance the cam loads and operation, bell crank 168 and cam 88 may be duplicated on both sides of the actuating sleeve 100, for which purpose shafts 170 and 86 may be suitably elongated.

Referring now to FIGS. 1 and 2, the means for clamping the tubing 24 against rotation will be described.

The clamp carriage 186 comprises an upstanding transverse anvil plate 188 with two slide openings 190 slidably embracing the guide rods 192 which are fastened to the bed plate 26 by means of a bracket 194. On the end plate 188 mounted along the left hand edge as shown in FIG. 2 is a trunnion 196 consisting of a pair of upstanding vertically elongated plates 198 welded on both sides thereof and having a pair of aligned upper holes 200 for a pivot pin 202. A lever 204 with an arm 206 and a jaw 208 is pivoted at its mid portion on the pin 202. A hydraulic cylinder 210 is connected by a pivot pin 212 to an offset gudgeon 214 at the base of plate 188. A piston rod 216 extending from the cylinder 210 is connected by pivot pin 218 to an outer clevis portion 220 of lever arm 204. A suitable source of fluid pressure (not shown) actuates the cylinder 210 to clamp the tubing 24 between jaw and anvil 208, 188. Thus clamped, the tubing is held non-rotatable while the clamp carriage 186 slides along rails 192 to accommodate the feed of the tubing through the heads 20 and 22.

At the right hand end of the apparatus shown in FIG. 1, a stand 222 with roller 224 is provided on the bed frame 26 to support the corrugated outbye end of the tubing as it comes from the second, compressing head 22.

The indenting operation of the first head 20 will now be described.

Because of the geared connections described, the drive shaft 42 will rotate the head 20, sleeve 100, and cam 88 simultaneously. When the cam follower 184 is at its low point as shown in FIG. 1, the annular half die rings 110, 112 will be in their aligned, concentric, open position as shown in FIG. 4. At this time, the tubing 24 can be advanced through the head by hand, or automatically, or responsive to the operation of the second head 22 as will be described. Continued rotation of the cam 88 to a high point as indicated by the number 226 will shift annular half die rings 110, 112 eccentrically to the position shown in FIG. 10 to generate a groove 115 by indenting the exterior of the tubing. A relatively low, wide, externally convex corrugation 228 will be defined between adjacent grooves. Each annular half die ring will generate a corresponding half of the groove. Continued rotation of the cam 88 back to the low point 230 opens the indenting die means 108 by moving the annular half die rings to their concentric positions, thereby enabling the tubing to be advanced for the next groove.

An important feature of the present invention is that the forces across the indenting die are diametrically balanced in plane 6—6 (FIG. 4) during the groove indenting operation.

Once a series of grooves 115 have been generated as described, any suitable means may be employed to compress and shape the corrugations 228 to the desired configuration. One such means is the second head 22 shown schematically here and which will now be described.

Referring to FIG. 3, the second or compression head 22 comprises two matching half sections 234 and 236, split along a vertical plane intersecting the axis of the tubing. The two sections are interconnected somewhat in scissors fashion to facilitate opening and closing them. They have lower extensions 238 and 240 which are slidable and pivotable on an elongated shaft 242 which is supported on stand 56 carried by the bed frame. As shown in FIG. 1, both the inbye and outbye plates supporting the head 22 are so provided with extensions 238, 240. These are on opposite sides of the stand 56, for stability. Pairs of downwardly extending lever arms 244, 246 have springs 248 compressed between them to bias the head sections 234, 236 together in scissors fashion. Upper extensions 250, 252 straddle cam 62. When the cam 62 is in the position of FIG. 1, springs 248 close the head as shown in FIG. 4. When the cam 62 is rotated to separate the upper extensions 250, 252, the head 22 will be opened thereby enabling the head to be re-set in an axial direction relative to the tubing to facilitate automatic, forward advance of the tubing. The head 22 comprises first, second and third vertically split die supports 254, 256 and 258 respectively. See FIG. 4. The second support 256 is shiftable axially on bolts 260 fast in the first support 254. Springs 262 bias them apart as limited by the heads of bolts 260.

The third die support 258 is axially shiftable within bore 264 in the second support 256. Springs 266 bias the second and third supports apart, as limited by the inward flange 268 on the second support. The mounting member 258' is made of two sections which are fastened by bolts 270 respectively to halves of the third support 258.

The first, second and third supports 254, 256 and 258 carry, respectively, a first split die ring 272, each half of which is semi-circular; a second split die ring 274, each half of which is semi-circular; and a third split die ring 276, each half of which is semi-circular. When the two halves 234 and 236 of head 22 are closed, the corresponding semi-circular sections of die rings 272, 274 and 276 mate and provide continuous gripping engagement with the tubing in the appropriate grooves as will be hereinafter described.

As shown in FIG. 1, cam 58 engages die support 254 and is rotated by shaft 90 and worm wheel 80. Cam 60 engages die support member 258 and is rotated by shaft 92 and worm wheel 82. Between cams 58 and 60, the die rings 272, 274, and 276 are progressively compressed, extended, and axially moved, in predetermined sequence with the opening and closing controlled by cam 62 (FIG. 3). This compresses the corrugations to final desired configuration as will now be described in connection with FIGS. 11 through 15. Each of FIGS. 11–15 is an enlarged schematic representation of the three split die rings 272, 274, and 276 and the tubing 24. Each of the figures represents a different step in the corrugation compressing operation.

Operation of heads 20 and 22 to produce corrugated tubing from straight wall tubing will now be described.

To simplify the start-up description, assume the tubing is initially advanced by hand between successive operations of the indenting die means 108. When the leading end of the tubing 24 reaches the first split compressing die ring 272, the second head 22 is opened, the leading corrugation 228 is advanced into the space between the first and second die rings 272, 274, and the apparatus is then ready for continued, automatic, operation.

Figure 11:
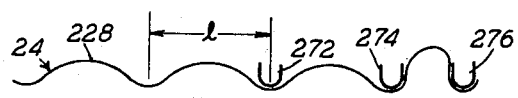

With the compression head 20 in closed position, as shown in FIGS. 4 and 11, the annular half die rings 110, 112 in the indenting head 20 will be shifted by cam 88, sleeve 100, and supports 114, 116 from the open, concentric position of FIG. 4 to the closed, eccentric position of FIG. 10 to generate a groove 115. Further rotation of the cam 88, as from high point 226 to low point 230, will return the annular half die rings to their open, FIG. 4 position.

Figure 12:
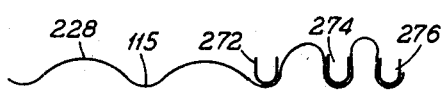

At this time, while the indenting die means 108 is held open by cam 88, the compressing head 22 will compress the corrugations in a 2-stage operation and advance the tubing for the next indenting operation. This is accomplished, first, by cam 60 holding the mounting plate 258' immobile while cam 58 crowds the supports 254 and 256 toward the plate 258' and third support 258. This compresses springs 262 and 266 to bring the die rings 272, 274 closer to die ring 276, namely to the position shown in FIGS. 9 and 12. This will compress the corrugation between first and second die rings 272 and 274 an intermediate amount while increasing its outside diameter; at the same time, it will further compress to final configuration, any corrugation between the second and third die rings 274 and 276, with a further increase in the outside diameter as shown in FIG. 12.

Figure 13:
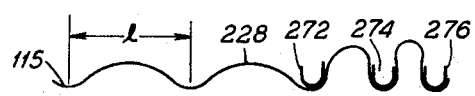

Next, the cams 58 and 60 will shift the whole head 22, forward, while still compressed, to the position shown in FIG. 13, this being accommodated by sliding along the pivot shaft 242 and the elongated cam 62.

At this stage, the tubing 24 has been advanced exactly the length "l" which is the distance between initial grooves produced by the head 20 and is therefore advanced to the point where it is ready for the next indenting operation.

Figure 14:
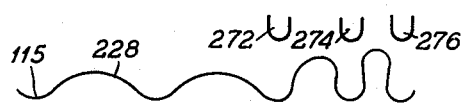
Figure 15:
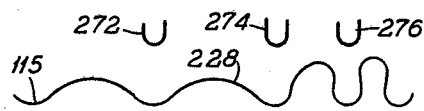

Next, cam 62 opens the compressing head 22 to clear the corrugations as shown in FIG. 14, and by concurrent operation of cams 58 and 60 the three die rings 272, 274 and 276 are shifted backward and returned to their extended positions as shown in FIG. 15 where they are aligned with a new set of grooves.

Subsequent actuation of the cam 62 closes the compression head 22. The returns the head to the FIG. 11 position and the apparatus is then ready to repeat the cycle beginning with shifting the annular half die rings 110, 112 from concentric to eccentric positions as above described.

While one form in which the invention may be embodied is herein shown and described, it should be understood that various modifications and variations in the invention may be attained without departing from the spirit and scope of the novel concepts thereof.

I claim as my invention:

1. In apparatus for forming annular corrugations in tubing comprising:
   a main frame having
     first and second spaced, axially aligned forming heads through which said tubing is adapted to pass;
     means to cause relative rotation between said first head and said tubing;
   said first head supporting a pair of freely rotatable annular die rings closely adjacent to one another along the axis of the tubing and adapted to encompass the tubing, each having an inner peripheral portion engageable with the tubing when shifted eccentrically of the tubing;

means for shifting both of said annular die rings eccentrically of said tubing to cause both of said inner peripheral portions to indentably bear on opposite side portions of said tubing and generate a single annular groove therein;

means for shifting said annular die rings to concentric, aligned positions to enable said tubing to be advanced therethrough for repeated generation of axially spaced annular grooves therein with externally convex corrugations therebetween;

means for advancing said tubing through said second head; and means carried by said second head for axially compressing said corrugations.

2. In apparatus for forming annular corrugations in tubing, the combination of claim 1 in which
said annular die rings have abutting surfaces which are relatively rotatable and relatively slidable against one another in a common plane.

3. In apparatus for forming annular corrugations in tubing, the combination of claim 2 in which
said first head includes biasing means urging said annular die rings toward aligned positions concentric with the tubing axis,
and said means for shifting the annular die rings eccentrically of the tubing includes means for overcoming said biasing means.

4. In apparatus for forming annular corrugations in tubing, the combination of claim 2 in which
each of said die rings is shaped to form a separate half of the annular groove in the tubing on opposite sides of said common plane.

5. In apparatus for forming annular corrugations in tubing, the combination of claim 1 in which
each of said die rings is rotatably journaled in a separate bearing, each of said bearings is mounted in a separate support, and each of said supports is slideable transverse to the tubing axis to shift the annular die rings between concentric and eccentric positions relative to the tubing.

6. In apparatus for forming annular corrugations in tubing, the combination of claim 5 in which
said supports are engageable with stops within the head to determine positions of concentricity of said annular die rings when their corresponding supports engage said stops;
spring biasing means urging said supports against said stops;
an extension on each support engageable by actuating means carried by the head;
and means controlled externally of said head and operable through said actuating means for moving said extensions simultaneously to shift said die rings eccentrically against the spring biasing means.

7. In apparatus for forming annular corrugations in tubing;
a first forming head comprising a housing rotatable about a tubing axis;
a pair of annular half die rings supported within said housing for free rotation independent of one another and each having an inner peripheral portion engageable with the tubing when shifted eccentrically, said inner peripheral portions being adjacent one another and cooperably effective as a single indenting die means;
means for shifting both of said annular half die rings transversely of the tubing from concentric to eccentric positions to cause their inner peripheral portions to indentably bear on diametrically opposite side portions of the tubing and to generate a single annular groove therein with each of said annular half die rings independently forming a corresponding half of said groove.

8. In a machine for forming annular corrugations in tubing, the combination of claim 7 in which
spring biasing means urges said annular half rings to a concentric position relative to the tubing axis;
and actuating means carried by the head is actuateable by exernal means to shift said annular half die rings eccentrically relative to the tubing axis against the urgence of said spring biasing means.

9. In a forming head, a rotatable housing having indenting die means comprising
a pair of annular half die rings supported within said housing for free rotation independent of one another about individual axes parallel to the rotational axis of the head and being in abutting adjacency with one another and cooperably effective as a single die ring;
means for shifting both of said annular half die rings simultaneously in opposite directions transversely of the rotational axis of the housing between concentric and eccentric positions relative to said axis.

References Cited

UNITED STATES PATENTS

| 2,631,645 | 3/1953 | Friedman | 72—77 |
| 3,128,821 | 4/1964 | Andersen | 72—77 |
| 3,143,794 | 8/1964 | Martin-Hurst | 113—116 |

RICHARD J. HERBST, Primary Examiner

U.S. Cl. X.R.

72—121